(12) United States Patent
Baszucki et al.

(10) Patent No.: US 10,743,076 B2
(45) Date of Patent: Aug. 11, 2020

(54) AUTOMATED CONTENT RATING SYSTEM AND NETWORK

(71) Applicants: David Baszucki, Portola Valley, CA (US); Ari Staiman, San Mateo, CA (US); Christina Shedletsky, Belmont, CA (US)

(72) Inventors: David Baszucki, Portola Valley, CA (US); Ari Staiman, San Mateo, CA (US); Christina Shedletsky, Belmont, CA (US)

(73) Assignee: Roblox Corporation, San Mateo, CA (US)

( * ) Notice: Subject to any disclaimer, the term of this patent is extended or adjusted under 35 U.S.C. 154(b) by 0 days.

(21) Appl. No.: 15/695,811

(22) Filed: Sep. 5, 2017

(65) Prior Publication Data

US 2019/0075363 A1  Mar. 7, 2019

(51) Int. Cl.
*H04N 21/472* (2011.01)
*H04N 21/475* (2011.01)
*H04N 21/442* (2011.01)
*H04N 21/854* (2011.01)
*H04N 21/258* (2011.01)

(52) U.S. Cl.
CPC ... *H04N 21/4756* (2013.01); *H04N 21/25891* (2013.01); *H04N 21/44204* (2013.01); *H04N 21/44222* (2013.01); *H04N 21/47202* (2013.01); *H04N 21/854* (2013.01)

(58) Field of Classification Search
CPC .......... H04N 21/4756; H04N 21/4758; H04N 21/4788; H04N 21/4667; H04N 21/44213; H04N 21/25883; H04N 21/8545; H04N 21/4722
See application file for complete search history.

(56) References Cited

U.S. PATENT DOCUMENTS

| | | | | |
|---|---|---|---|---|
| 6,738,978 | B1* | 5/2004 | Hendricks | H04H 20/10 348/E5.002 |
| 8,079,044 | B1* | 12/2011 | Craner | H04N 21/4532 725/28 |
| 2002/0124247 | A1* | 9/2002 | Houghton | H04N 5/44543 725/9 |
| 2005/0102696 | A1* | 5/2005 | Westberg | H04N 5/44543 725/46 |
| 2008/0172689 | A1* | 7/2008 | Feder | G06Q 30/02 725/28 |
| 2012/0046113 | A1* | 2/2012 | Ballas | A63F 13/00 463/43 |
| 2012/0309515 | A1* | 12/2012 | Chung | H04N 21/274 463/31 |

(Continued)

*Primary Examiner* — Hsiungfei Peng
(74) *Attorney, Agent, or Firm* — Donald R. Boys; Central Coast Patent Agency LLC (57) ABSTRACT

A system for rating user-generated content (UGC), has a network-connected server hosted by an enterprise, enabling registered participants to select UGC from a network-connected repository, the content then presented to the selecting participants. A data repository is coupled to the network-connected server, storing profile information regarding individual ones of the registered participants, and rating software executes on the network-connected server, providing functionality for creating age-appropriate rating for individual ones of the UGC.

14 Claims, 4 Drawing Sheets

(56) References Cited

U.S. PATENT DOCUMENTS

| | | | |
|---|---|---|---|
| 2014/0330734 A1* | 11/2014 | Sung | G06Q 10/1053 705/321 |
| 2015/0356468 A1* | 12/2015 | Cummins | G06Q 10/02 705/5 |
| 2015/0363802 A1* | 12/2015 | Varian | G06Q 30/0203 705/7.32 |
| 2019/0075363 A1* | 3/2019 | Baszucki | H04N 21/4756 |

* cited by examiner

AUTOMATED CONTENT RATING SYSTEM AND NETWORK

BACKGROUND OF THE INVENTION

1. Field of the Invention

The present invention is in the field of online video gaming and pertains particularly to methods and apparatus for crowd sourcing information from game players, and using that data in an automated ratings system.

2. Discussion of the State of the Art

Digital video is notoriously well-known in a wide variety of applications, including entertainment, education, news propagation, and much more. Further, there are a wide variety of enterprises that provide on-line platforms for users to post and generate video content, and many of these enterprises are sensitive to the nature of the content generated and posted for consumption. The content generated and posted by associates and members of such enterprises is termed herein User-Generated Content (UGC). Managers of such enterprises want to vet all content with which they may be associated, to be sure the content is appropriate for a target audience that may have access to the video content.

In a subset of the content of interest as UGC, in the art of video gaming there are providers that cater to children as part of a gaming market. There are also laws that govern what types of information a service provider may gather from underage video game players, wherein certain data are permitted to be collected only if consent is given by a parent or guardian.

Children make up a large portion of clientele in the video gaming industry, and all video game content must be rated for age suitability and must advertise that rating. Certain content may not be provided to a minor unless the rating for the content permits. A video game provider must have a ratings system that complies with current laws, such as the child online privacy protection act (COPPA). Providers may be fined for violating or failing to adhere to current laws.

It is to be understood that, even for a video-gaming enterprise, that may cater to children and young people, it is not just video games that may be a problem. Members of such sites may also have access to and generate content as interactive live video streams, social network posts, and blog posts, among others.

In current state of the art video rating, providers either rate their own content and content they are hosting, or they hire or otherwise contract a third party or service to do so. A challenge with this approach is the sheer number of new games, video streams, social network posts, blogposts, and other video UGC that may exist, representing unrated content that must be reviewed and rated properly before making the content available to a general client base online. Notwithstanding, there are video games and other video media that may be further developed and updated with new content in the field. Such media may require re-rating to insure the new content added is appropriate under the rating already applied. So, re-rating is a concern as well. In some circumstances one video provider may have thousands of games and other media available for consumption, and many new games and other media under development. Keeping up with rating can be a serious challenge.

Therefore, what is clearly needed is a system and method for rating UGC that eliminates and or at least seriously reduces the work required currently to rate video content.

BRIEF SUMMARY OF THE INVENTION

In one embodiment of the invention a system for rating user-generated content (UGC) is provided, comprising a network-connected server hosted by an enterprise, enabling registered participants to select UGC from a network-connected repository, the content then presented to the selecting participants, a data repository coupled to the network-connected server, storing profile information regarding individual ones of the registered participants, and rating software executing on the network-connected server, providing functionality for creating age-appropriate rating for individual ones of the UGC. Participants are tracked for participation in consuming content, are solicited to elicit the participant's opinions regarding content of UGC consumed, and opinions are collected and used in creating ratings for the UGC.

In one embodiment of the system data from profiles of individual players is extracted from the data repository storing profiles, and associated with responses to surveys made by the same players. In one embodiment players are provided with surveys upon leaving an interaction with UGC. IN one embodiment incentives are offered to players to participate in rating. And in one embodiment, in the tracking of players, a player's time spent in interaction is tracked, and a survey is provided only if a player has spent a pre-determined minimum.

In one embodiment of the system the rating software selects items for rating by survey, that have not been rated, and that have been altered since last being rated. In one embodiment surveys are provided to players through a pop-up window system. IN one embodiment surveys are provided to players through a chat application. In one embodiment, individual players are selected for surveys based on archived survey history. And in one embodiment, pre-stored ratings language is displayed with promotions for UGC, the ratings language indicating appropriate age for players.

In another aspect of the invention a method for rating video games is provided, comprising tracking players interacting with user-generated video content (UGC) by rating software executing on a network-connected server hosted by a content provider, enabling registered players to select content from a network-connected engine, providing pre-prepared surveys to individual ones of the players, eliciting player's opinions regarding content, and collecting and using player's response to the surveys in creating rating.

In one embodiment of the method, data from profiles of individual players is extracted from a data repository storing profiles, and associated with responses to surveys made by the same players. Also in one embodiment, players are provided with surveys upon leaving an interactive session. In one embodiment, incentives are offered to players to participate in rating. And in one embodiment, in the tracking of players, a player's time spent is tracked, and a survey is provided only if a player has spent a pre-determined minimum time.

In one embodiment of the method, the rating software selects items for rating by survey, that have not been rated, and that have been altered since last being rated. Also in one embodiment, surveys are provided to players through a pop-up window system. In one embodiment, surveys are provided to players through a chat application. In one embodiment, individual players are selected for surveys based on archived survey history. And in one embodiment, pre-stored ratings language is displayed with promotions for UGC, the ratings language indicating appropriate age for players.

DETAILED DESCRIPTION OF THE INVENTION

In various embodiments described in enabling detail herein, the inventor provides a unique system for rating video content. The present invention is described in enabling detail using the following examples, which may describe more than one relevant embodiment falling within the scope of the present invention.

In many examples illustrated and described herein, video games are presented as UGC requiring rating. It is emphasized that these are indeed merely examples, and the functions and methods described will be useful as well for rating essentially any sort of user-generated video content, termed UGC herein.

Figure 1:
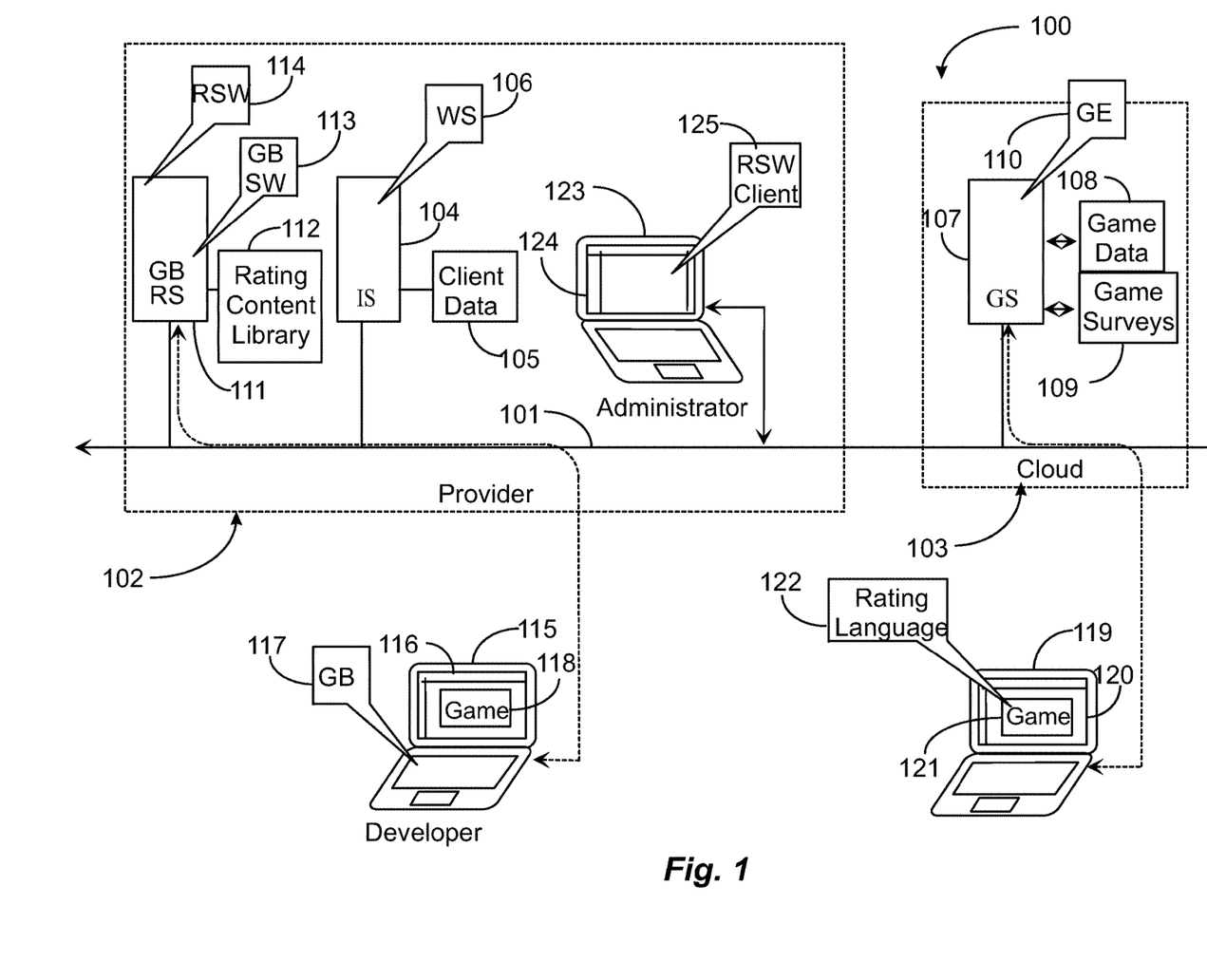
FIG. 1 is an architectural diagram depicting a video network enabling automated rating using crowed sourced data.

FIG. 1 is an architectural diagram depicting a video gaming network 100 enabling automated game rating using crowd-sourced data. Gaming network 100 may be an Internet network depicted herein by a network backbone 101. Network backbone 101 may represent all of the equipment, lines, and access points that make up the Internet as a whole including any connected sub-networks having connection to backbone 101. Therefore, there are no geographic limits to the practice of the present invention. Network 100 may also be a corporate wide-area-network (WAN) or local-area-network (LAN), or a wireless municipal area network (MAN) without departing from the spirit and scope of the present invention. The inventors choose to depict network 100 as an Internet network in this example due to the high public access characteristics of the Internet in general. Being connected to an Internet network should not be construed as a limitation.

Network backbone 101 supports a network-based video gaming provider domain 102 through which customers, such as provider site members, may access and play video games. Provider domain 102 includes an information server (IS) 104 having connection to backbone 101. Information server 104 may host a Web site (WS) 106 that enables the provider to promote games and other video media to the public, and to register subscribers to join and to have access to video content, such as games, hosted by the provider. WS 106 in one embodiment is a member access site that creates and manages member accounts according to terms of service adopted by the provider. Information server 104 in this embodiment has connection to at least one data repository 105 adapted to store client or member data of all of the current and active members of the site. Client data in repository 105 may include identification data, client user name, authentication credentials and gaming alias, as well as account information, game play history, client profile data, client friends list, client billing and payment methods, and any other client data that may be deemed important such as client gender, and age that might be required information before accessing certain video content, such as games, according to content appropriateness ratings.

Provider 102 may host development tools and services, including sponsoring a club or online network of game builders and other content creators. A game builder or developer, or other content creator, may be a site member of WS 106 and may access the site using a computing appliance over the Internet network, such as computing appliance 115, a laptop computer in this example. Network backbone 101 supports a build and rating server 111 within the domain 102 of the provider. Server 111 may host video game build software (GBSW) 113, and software enabling users to create and post a wide variety of video content. SW 113 may include tools and resources made available to member developers, such as a developer operating laptop computer 115.

Server 111 may host a video rating software (RSW) 114 adapted to automatically rate video game and other content as appropriate or not appropriate relative to an active member base. Server 111 has connection to at least one data repository 112 adapted to contain rating content or a rating content library. Content library 112 may include any data that may be required to enable automated ratings including text content, graphic content, audio content, and operational rules. This content may be, for example, examples of images, words, phrases, and so on, that may affect rating for age suitability.

Video content, such as games, that is rated and hosted by provider 102, may be accessed from a cloud server network such as cloud 103. At least one content server, which may be a game server (GS) 107 may be provided for site members to connect to in order to play video games, and to interact with other video content. Game server 107 in this example, includes at least one instance of a software game engine (GE) 110. GE 110 is adapted to serve video games to active players who have joined those games and were subsequently redirected to server 107 for participation. Server 107 has connection to at least one data repository 108 adapted to contain game data and files for streaming service.

In this example, a player member of provider WS 106 is operating a computing appliance such as laptop computer 119 and is engaged in session with server 107 and GE 110 to play a video game 121 displayed on a laptop computer 119 through a browser-based network application 120. In this example, video game 121 includes rating language, such as a visible rating label or description 122, that is visible to any player who plays a video game, and therefore to anyone monitoring the player, such as a parent of an underage player, for example. In one embodiment, all new games created by a developer member of WS 106, such as a member operating laptop 115 using a client game building software (GB) 117 may be rated for appropriate content in server 111 with the aid of rating SW 114. The same may apply as well to other UGC.

In one embodiment, an administrator operating a computing appliance connected to network (101), such as a laptop computer 123 within provider domain 102, may manually rate video games and other content, or may configure and automate RSW 114 on server 111 to rate games and other content with the aid of a browser-based application 124 and rating software (RSW) client application 125. Video games hosted by provider 102 that require content rating for viewing appropriateness may include new games that have never been rated and previously rated video games that have undergone changes or updating where unrated content may have been added to the video game.

In this implementation, RSW 114 relies at least in part on information provided by players who have had experience playing a video game that is targeted for rating. In this regard, information may be solicited from video game players via a game rating survey that may be tailored for a member gender and age profile, and that might also be customized or dedicated to the video game being rated. In this implementation, a player such as one operating laptop computer 119 in session with GS 107 and GE 110 playing game 120 may be prompted upon exit of game 120 to take a game rating survey, such as game surveys contained in a data repository 109 having connection to server 107. A survey may be a list of yes or no questions or a list of questions with multiple choice answers that might be checked or otherwise selected by a user taking the survey. In one embodiment, players may be recruited to actively answer survey rating questions through an incentive program by provider 102. More broadly, the RSW may be applied as well to other sorts of video content.

In one embodiment surveys may be generated by an administrator, such as an administrator operating laptop 123 within the domain of provider 102, who may be charged with the task. Surveys may be stored with content they are created to address, and may be unique to and dedicated to gather information relative to a single video content, like a game, that requires rating. In another implementation, a survey may be more general and may address a group of or a category of content more broadly, at least from the perspective of the provider. That is to say that the survey may be sent to a player who just left a game, or had just reviewed a video content of some other sort, wherein the player's answers may contribute to ratings of other similar videos of the group or category rated.

In a possible use case example of the implementation referenced above, a batch of video games from a defined group of games or category of games may be rated as a group of games, wherein the survey data collected from players of any one or individual ones or all of the games in the category may be associated to the group and used to weigh or even to determine with no other input the rating given to the group or category, which may be appended to an individual label rating language, such as rating language 122, in any of or in all of the games belonging to that particular group. Other video content may be treated in a batch mode similarly.

Logic used to order each group or category may rely on similarity of and commonality of the instances of theme, features, objectives, characters, and language present in the group (batch) data as a whole, as well as in part on any target information describing the intended audience demographic, such as for children ages 10 to 14 for example. A category of video content would then not logically include both video content targeted for adults and video content targeted for children, for example. In a variation to this implementation, an instruction may be generated and provided to an administrator assembling a batch or group of games or other content for rating by searching the content according to a list provided within the instruction of common attributes in their titles, in their data, and in any metadata associated with the content, such as target demographic information identifying an audience for which the content was created, which may be information submitted by the developer and made available to the search engine.

Figure 2:
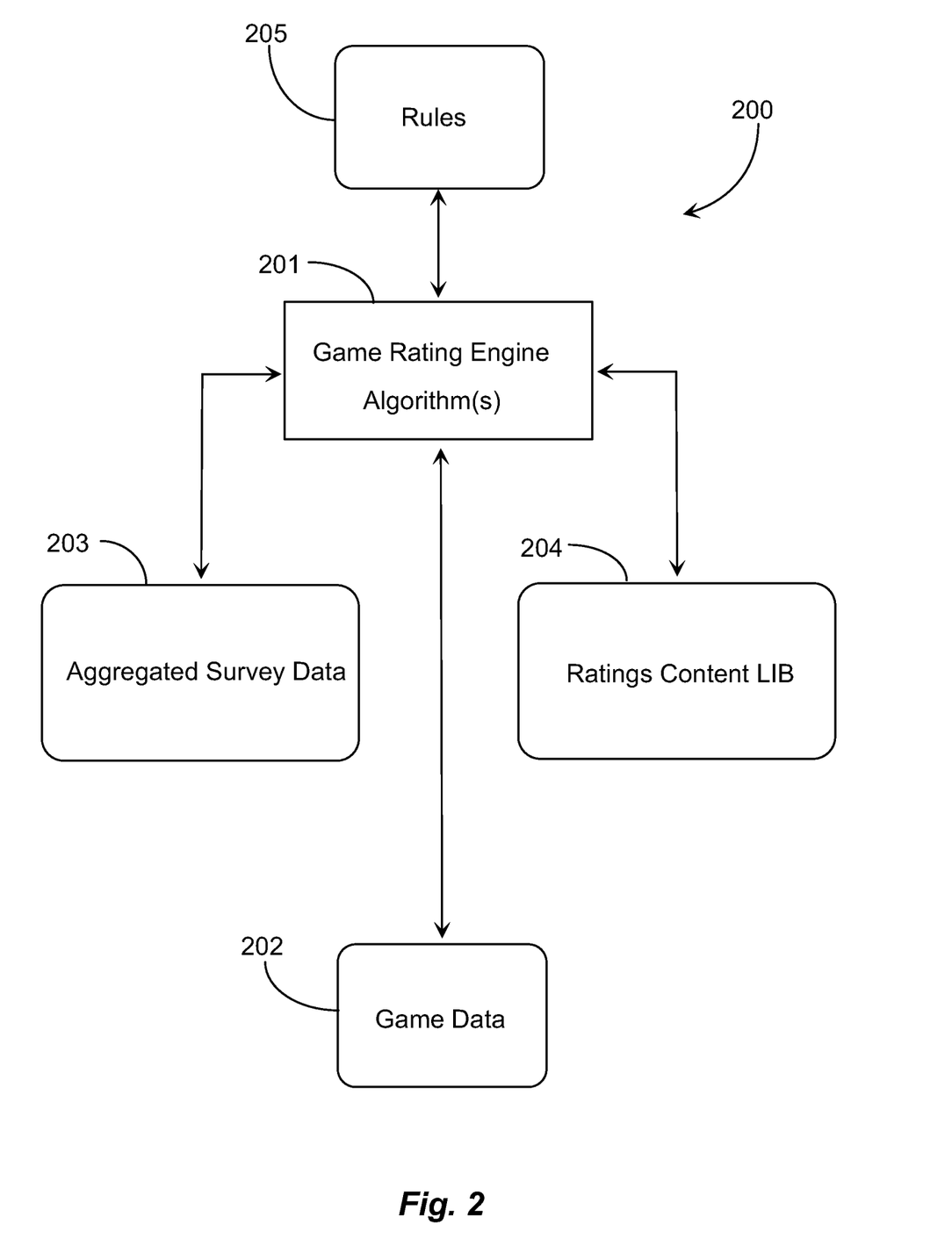
FIG. 2 is a block diagram depicting a rating engine of the rating SW of FIG. 1 and depicting access to one or more data resources available to the rating engine.

FIG. 2 is a block diagram depicting a game rating architecture 200, a structural component of the rating SW of FIG. 1, and depicting access to one or more data resources that may be available to enable video UGC rating. Rating architecture 200 includes a rating engine 201. Rating engine 201 is at the heart of architecture 200, and performs all the data processing required to produce a rating for a single UGC or for a category. Rating engine 201 may employ software routines and algorithms in management of relevant data received or accessed and in calculating algorithmically what rating value may be generated.

Rating engine 201 may incorporate text and optical recognition capabilities as well as speech recognition capabilities afforded by SW modules and supporting data bases to disseminate and to categorize data that may be available to engine 201 from at least one data source of content data 202. Data source 202 may be a data repository that may be external from or locally available to a computerized node that may be hosting the rating engine. Rating engine 201 may process data selectively relative to any received content data belonging to a video media and the data may be processed from a data stream or from a static data source.

Rating engine 201 has access to at least one ratings content library (LIB) 204. LIB 204 may be analogous to content library 112 of FIG. 1. LIB 204 may include text and graphic examples that are rated whereby part of the text examples may have been previously rendered from speech. LIB 204 may support engine comparison analysis of content data against the examples, where matching provides an inclination to or suggestion of a particular rating level. For example, an evil avatar that crushes enemies with clubs in a game may have a suggested rating in ratings content library 204 and matching to that avatar using a data avatar may provide a rating suggestion for that component of the data.

Rating engine 201 also may have access to a rules base 205. Rules base 205 may contain conditional rules, general data processing rules, rating application and distribution rules, and so on. Engine 201 may consult rules base 205 at any stage during rating. Aggregated survey data may be made available from a data repository 203 or from a local or on-board data source. Aggregated survey data 203 may be pre-rated using the same rating values used to rate content and to rate the data in LIB 204 for reference purposes. An evil avatar in survey data 203 may have a different rating value than an attribute-similar avatar in LIB 204. Furthermore, in the case of aggregated data, there may be numerous rated instances of a same avatar and or of similar but not identical avatars, and an associated rating value listed or otherwise available to the rating engine. The game rating engine may average those different ratings values to produce an averaged ratings value for that avatar or defined class of avatars.

Engine 201 may incorporate aggregated survey data from repository 203 to obtain ratings values that are determined by the survey responders and compare those values with other values associated with like characters, themes, texts, or graphics of the data rated through comparison with data in LIB 204. Values associated with all the different items of content may be further processed to derive an overall nominal rating value for any content or any category or group. Rating engine 201 may apply a new rating value to a video content or category of video content, and may subsequently provide system updates to the data stores such as data repository 108 in cloud network 103 of FIG. 1.

In one implementation where engine 201 is used to rate a grouping of video content, Rating engine 201 may cut one or more video presentations from receiving the finalized rating and force those presentations to be rated according to another category, effectively reclassifying the presentations to another or other groups to be rated with other content. Also, one group of presentations may be split into two different groups, where each group has a different rating.

In one embodiment of the invention, creators of UGC may be solicited by prepared surveys to rate their creations. This may be done for each new instance of UGC, such as a game, or may be done periodically, to keep a rating current, and may be done any time UGC is altered. In one embodiment a same, or very similar survey may be processed with a creator of the UGC, and also with a plurality of consumers of the UGC, such as players of a game. The feedback to a same or similar survey provided to both creators and consumers provides valuable information to the system, which may then rate creators according to the difference between their opinions of their own content, and the players opinions of the same content.

Figure 3:
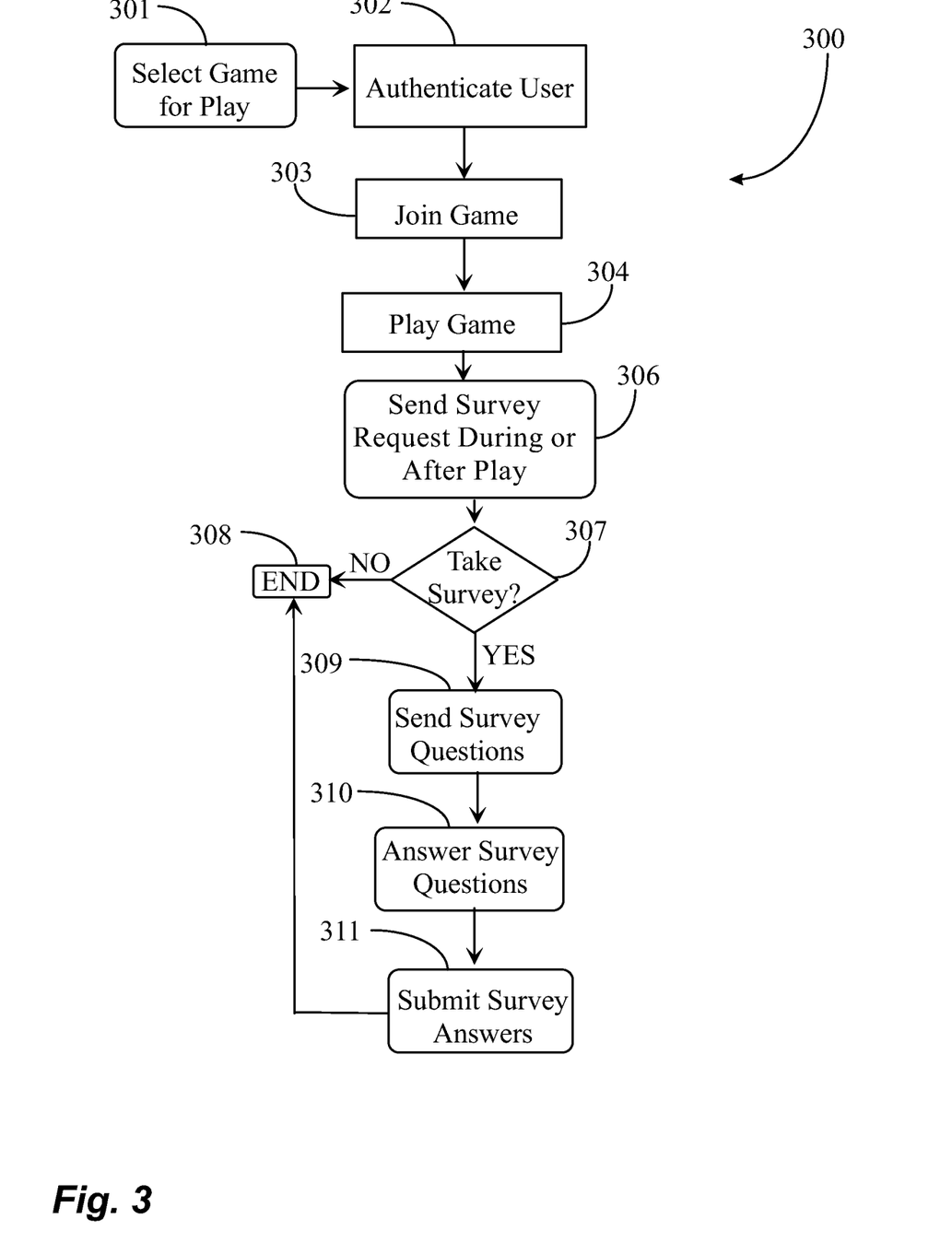
FIG. 3 is a process flow chart depicting steps for gathering information for rating according to an embodiment of the present invention.

FIG. 3 is a process flow chart 300 depicting steps for crowed sourcing information for rating according to an embodiment of the present invention. Process 300 assumes that a member of the provider site is online and in session with the information server and Website. In this regard, the player may have a gaming application that is browser-based, installed on the accessing computing appliance. In such an implementation, the player would connect by accessing the Internet and then executing the application that provides a local version of the Website services customizable to the player's device and operating system and perhaps somewhat to the player's preferences.

At step 301 the player may select a game for play, or other video content to view, through the local application or directly from the website. At step 302 the service may require authentication of the user before allowing the user to join. In one aspect, there may be ratings information already available and visible to the player before the player selects the content. In another aspect, the player may have been recruited to interact with unrated content. At step 303, the player may join, which may involve redirecting the player to a running instance of the content at a cloud server. In step 304, the player interacts with the content, or plays a game, for a specific amount of time. If a player was recruited to play an unrated game, for example, and to answer the associated survey questions, there may be a minimum amount of time imposed before survey questions would be made available. Otherwise for a player who is just viewing content, the system might require a specific minimum of time of viewing before prompting the player to take a survey becomes an option.

At step 306 a survey request is sent to the player. This may happen during play of the game, or after the player has quit the game, although, if after play, the request should be within a reasonable time, so the game impressions are fresh for the player.

At step 307, the player may determine whether to take the rating information survey. If the player determines not to honor the request to take the survey at step 307, the process may then end for that player. If the player determines to take the survey at step 307, the game engine or chat moderator may send one or more survey questions to the player at step 309. At step 310 the player may provide one or more answers to the one or more survey questions. The survey may be conducted in different ways, for example, a first question may be asked and answered before a second question is sent. In one implementation, a complete list of questions is sent in an electronic document that may be interacted with to select system-controlled answers to the question, for example answering a question with multiple choice answers given to the player.

At step 310 the player answers the survey questions. Answers may be restricted to yes or no or to one of multiple choice answers, or a combination of the each. A sample question may be: Was your avatar non-violent, mildly violent, or extremely violent when combating the evil princess. Another might be: Did your avatar speak during the game, yes or no, and if yes, did it use any curse words, yes or no? Yes or no might be provided answers that are selected by the player or the player may provide spoken or typed input to answer the survey questions. At step 311 the player may submit the survey data (survey answers) to the requesting service incrementally as a part of back and forth transacting before exiting the page. Once the data is submitted, the process may end for that player. Process 300 may be an automated process that occurs at any event where the player confirms to take the survey after just playing the game. Certain profile information of the player may also be appended to the survey answers given. The raw data collected in the survey may be stored along with the player and game identification in a repository database linked to the game or category of games that the ratings survey addressed.

Figure 4:
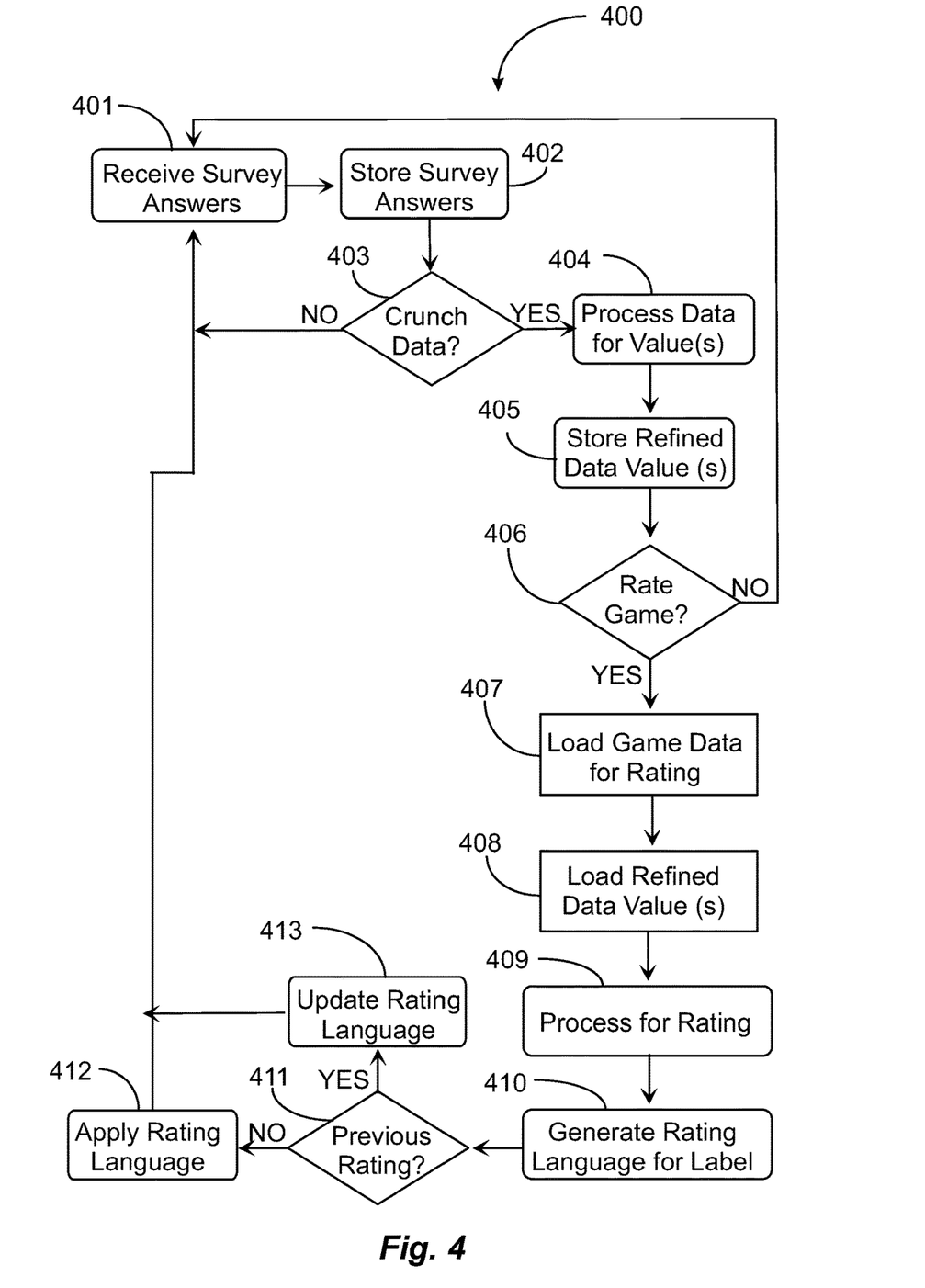
FIG. 4 is a process flow chart depicting steps for rating a video presentation and incorporating crowed-sourced data in the rating according to an embodiment of the present invention.

FIG. 4 is a process flow chart 400 depicting steps for rating UGC and incorporating crowed-sourced data in the rating according to an embodiment of the present invention. Process 400 begins at step 401 where the system receives the survey answers from the player of FIG. 3 step 311. The received answers may be stored in association with the survey questions in repository 109 and then may be forwarded. As survey data is aggregated about one instance or a group, the system may make determination if it has sufficient data from players to process that data and have that data be useful in rating.

If at step 403 the system determines not to process the data received, then the process may loop back to step 401 and step 402 for other players still interacting. One goal is to collect sufficient data that would produce accurate ratings values, hence there may be a minimum amount of data required by the system about one or more than one item before determining to rate. If the system determines there is enough data to process at step 403, then the process may move to step 404 to process the survey data for useful information required to rate the UGC. At step 405 the system may store any survey results for later access by a running rating process. At step 406, the system may determine whether to begin rating. There may be a minimum requirement of a specific amount of data aggregation of survey answers for an item or a batch of items before rating may commence. If the system determines not to rate at step 406 the process may loop back to receiving survey data. If the system determines to rate at step 406, the game data for rating may be loaded into the rating engine or otherwise accessed by the rating engine at step 407.

At step 408 the system may load or access refined data values created from the raw data at step 404. It is noted herein that decision step 403, preprocessing steps 404 and 405 are not specifically required to practice the present invention. At step 409, the rating engine may process the loaded data and the survey answer data, which may be refined to already reflect one or more ratings values. At step 410 the ratings engine may generate rating language for the label or group category.

At step 411 the system may determine if an item rated or group of items rated had a previous rating. If the system determines that the item or group was previously rated, the ratings engine may update the rating language at step 413. If the system determines the item or category had not been rated before, then the ratings engine applies the rating language to label for the first time and in association with the item or category at step 412. The process then continually loops as items and groups are queued for rating.

It will be apparent to one with skill in the art that the content rating system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will further be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below:

The invention claimed is:

1. A system for rating video games as age appropriate, comprising:
   - a network-connected server hosted by an enterprise, including rating software stored and executing thereon, and the network-connected server, enabling players registered with the enterprise and connected to the server by game platforms connected through the network, to select video games to play from an interactive interface, wherein the selected-video games are then streamed to the selecting player from a network-connected game server; and
   - a data repository coupled to the network-connected server, storing surveys having a plurality of survey questions regarding age-appropriate nature of content of the selected video games and profile information regarding individual ones of the registered players, including data regarding time spent playing the selected video games in the enterprise, and history regarding participation in survey activity;
   - wherein individual ones of the registered players, having played a specific video game, of the selected video games, are sent, immediately after leaving the specific video game, one of the surveys; and
   - wherein answers to the survey questions by the individual players, the time spent playing the specific selected video game by the individual players, and history of players regarding participation in survey activity are used in part to determine an age-appropriate rating for the specific selected video game by the rating software.

2. The system of claim 1 wherein incentives are offered to players to participate in surveys.

3. The system of claim 1 wherein surveys are sent to players who have spent a pre-determined minimum amount of time in playing video games at the enterprise.

4. The system of claim 1 wherein video games are selected for rating in part by having been altered since last being rated.

5. The system of claim 1 wherein surveys are provided to players through a pop-up window system.

6. The system of claim 1 wherein surveys are provided to players through a chat application.

7. The system of claim 1, wherein the data repository further stores a rating content library that includes data for use by the rating software, the data including text content, graphic content, audio content, and operational rules related to age suitability for the video games.

8. The system of claim 7, wherein the rating content library includes text or graphic examples that are rated, and wherein the rating content library supports comparison of game content data against the text or graphic examples, wherein matching examples are indicative of a particular rating level associated with the matching examples.

9. A method for rating video games as age-appropriate, comprising:
   - providing video games to players registered with an enterprise and connected to a network-connected server hosted by the enterprise, through game platforms connected through the network;
   - receiving a selection of a video game to play by individual ones of the registered players through an interactive interface;
   - streaming the selected video game to the individual ones of the registered players from the network-connected game server;
   - tracking time spent playing the selected video game and history of survey activity for the individual registered players, and storing same as data in a data repository coupled to the network-connected server;
   - sending surveys, each with a plurality of questions regarding age-appropriate nature of content in the selected video game to the individual ones of the registered players, having played the selected video game, immediately upon the players leaving the selected video game; and
   - using answers to the survey questions, the tracked time spent playing the selected video game, and history of players regarding participation in survey activity to determine an age-appropriate rating for the selected video game.

10. The method of claim 9 comprising offering incentives to players to participate in surveys.

11. The method of claim 9 comprising only wherein the sending surveys to players is performed such the surveys are sent to one of the individual players who have spent a pre-determined minimum time in playing the selected video game at the enterprise and the surveys are not sent to other players.

12. The method of claim 9 comprising selecting video games for rating that have been altered since last being rated.

13. The method of claim 9 comprising providing surveys to players through a pop-up window system.

14. The method of claim 9 comprising providing surveys to players through a chat application.

* * * * *